(12) United States Patent
Gubbi (10) Patent No.: US 6,480,506 B1
(45) Date of Patent: Nov. 12, 2002

(54) CO-LOCATION NEGOTIATION SCHEME FOR WIRELESS COMPUTER NETWORKS

(76) Inventor: Rajugopal R. Gubbi, 8842 Winding Way, Apt #123, Fair Oaks, CA (US) 95628-6467

( * ) Notice: Subject to any disclaimer, the term of this patent is extended or adjusted under 35 U.S.C. 154(b) by 0 days.

(21) Appl. No.: 09/293,558

(22) Filed: Apr. 15, 1999

(51) Int. Cl.[7] .......................... H04J 3/00; H04L 12/43; H04Q 7/20
(52) U.S. Cl. ...................... 370/468; 370/280; 370/337; 370/458; 455/450; 455/452
(58) Field of Search ................................ 370/468, 329, 370/280, 458, 461, 465, 337, 442; 375/202, 203, 206; 455/450, 452, 464, 554, 555

(56) References Cited

U.S. PATENT DOCUMENTS

| | | | |
|---|---|---|---|
| 4,284,848 A | | 8/1981 | Frost |
| 4,972,456 A | | 11/1990 | Kaczmarek et al. |
| 5,142,533 A | * | 8/1992 | Crisler et al. ............... 370/95.1 |
| 5,471,671 A | | 11/1995 | Wang et al. |
| 5,697,059 A | * | 12/1997 | Carney ....................... 455/34.1 |
| 5,729,531 A | * | 3/1998 | Raith et al. .................. 370/252 |
| 5,737,691 A | * | 4/1998 | Wang et al. ................... 455/63 |
| 5,805,633 A | * | 9/1998 | Uddenfeldt .................. 375/202 |
| 5,887,261 A | | 3/1999 | Csapo et al. |
| 5,970,068 A | * | 10/1999 | Gray et al. .................. 370/395 |
| 6,014,385 A | * | 1/2000 | Ayanoglu et al. ........... 370/458 |
| 6,016,311 A | * | 1/2000 | Gilbert et al. ............... 370/280 |
| 6,031,845 A | * | 2/2000 | Walding ....................... 370/468 |
| 6,038,589 A | * | 3/2000 | Holdsworth et al. ........ 709/201 |
| 6,041,061 A | * | 3/2000 | Su ............................... 370/461 |
| 6,091,740 A | * | 7/2000 | Karasawa .................... 370/458 |
| 6,137,787 A | * | 10/2000 | Chawla et al. ............... 370/337 |

FOREIGN PATENT DOCUMENTS

| | | |
|---|---|---|
| EP | 0565499 A1 | 3/1993 |
| EP | 0621707 A2 | 4/1994 |
| EP | 0830045 A2 | 8/1997 |
| WO | WO 98/14020 | 4/1998 |
| WO | WO 98/21909 | 5/1998 |
| WO | WO 99/17575 | 4/1999 |

* cited by examiner

Primary Examiner—Wellington Chin
Assistant Examiner—M. Phan
(74) Attorney, Agent, or Firm—James J. Murphy; Winstead Sechrest & Minick (57) ABSTRACT

Bandwidth within a common wireless communication channel used by a number of independent computer networks is allocated by assigning a portion of the total bandwidth of the common wireless communication channel to intra-network communications in each of the independent computer networks. This bandwidth allocation scheme may, from time to time, involve revising existing bandwidth allocations for one or more of the independent computer networks, for example when new networks or new clients in existing networks request bandwidth within the channel. The intra-network communications may occur within a slotted link structure that includes transmission times for master and client devices of the respective network. These transmission times are preferably arranged within a hierarchy that includes transmission times for master and client devices of other networks that share the wireless communication channel. At least one of the computer networks includes a master coordinator unit configured to allocate bandwidth utilization for the common communication channels among the independent computer networks. In some cases, one or more of the independent computer networks may communicate with the master coordinator unit through a proxy-coordinator unit located in a separate one of the independent computer networks from that of the master coordinator unit, in the same computer network as the master coordinator unit or in the same computer network as is utilizing its services.

31 Claims, 5 Drawing Sheets

| OPERATING SUBNETS | | BANDWIDTH REQUESTED | BANDWIDTH ALLOCATED |
|---|---|---|---|
| SUBNET-ID | SS-ID | | |
| ○ | ○ | ○ | ○ |
| ○ | ○ | ○ | ○ |
| ○ | ○ | ○ | ○ |

120 SUBNET TABLE

CO-LOCATION NEGOTIATION SCHEME FOR WIRELESS COMPUTER NETWORKS

RELATED APPLICATION

This application is related to and hereby claims the priority benefit of a co-pending application, Ser. No. 09/151,452, entitled Hierarchical Computer Network Architecture, filed Sep. 11, 1998, and assigned to the Assignee of the present invention.

FIELD OF THE INVENTION

The present invention relates generally to communications in a computer network and, in particular, to a scheme for accommodating multiple overlapping networks that share a common communication channel.

BACKGROUND

In the above-referenced co-pending application, Ser. No. 09/151,452, which is incorporated herein by reference, a computer network adapted for use in the home environment was described. That architecture included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used. Preferably, the communication channel is supported on a wireless communication link.

Figure 1:
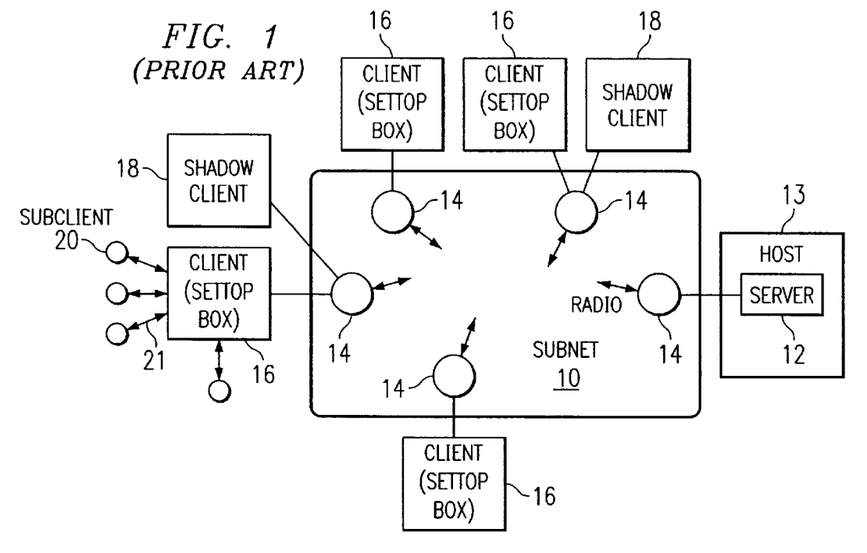
FIG. 1 illustrates a generalized network structure that is supported by a wireless communication protocol.

The generalization of this network structure is shown in FIG. 1. A subnet 10 includes a server 12. In this scheme, the term "subnet" is used describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, personal computers, satellite television receivers, cable television distribution nodes, and other household appliances.

Server 12 may be a separate computer that controls the communication link, however, in other cases server 12 may be embodied as an add-on card or other component attached to a host computer (e.g., a personal computer) 13. Server 12 has an associated radio 14, which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 21, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using, for example, wired communication links or wireless communication links such as infra-red links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

Figure 2:
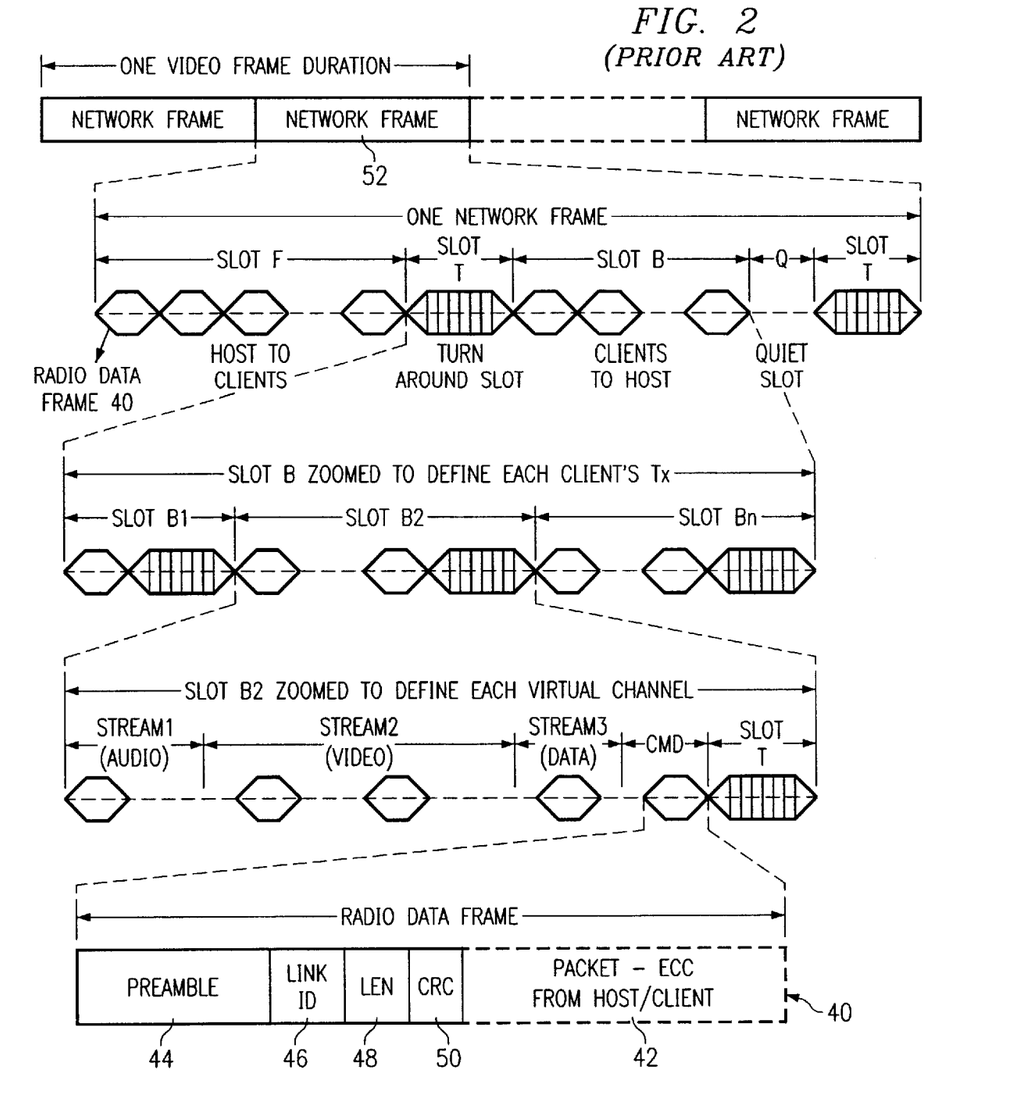
FIG. 2 illustrates the slotted link structure of the wireless communication protocol used within the network shown in FIG. 1.

The slotted link structure of the wireless communication protocol for the transmission of real time, multimedia data (e.g., as frames) within a subnet 10 is shown in FIG. 2. At the highest level within a channel, forward (F) and backward or reverse (B) slots of fixed (but negotiable) time duration are provided within each frame transmission period. During forward time slots F, server 12 may transmit video and/or audio data and/or commands to clients 16, which are placed in a listening mode. During reverse time slots B, server 12 listens to transmissions from the clients 16. Such transmissions may include audio, video or other data and/or commands from a client 16 or an associated subclient 20. At the second level of the hierarchy, each transmission slot (forward or reverse) is made up of one or more radio data frames 40 of variable length. Finally, at the lowest level of the hierarchy, each radio data frame 40 is comprised of server/client data packets 42, which may be of variable length.

Each radio data frame 40 is made up of one server/client data packet 42 and its associated error correction coding (ECC) bits. The ECC bits may be used to simplify the detection of the beginning and ending of data packets at the receive side. Variable length framing is preferred over constant length framing in order to allow smaller frame lengths during severe channel conditions and vice-versa.

This adds to channel robustness and bandwidth savings. Although variable length frames may be used, however, the ECC block lengths are preferably fixed. Hence, whenever the data packet length is less than the ECC block length, the ECC block may be truncated (e.g., using conventional virtual zero techniques). Similar procedures may be adopted for the last block of ECC bits when the data packet is larger.

As shown in the illustration, each radio data frame 40 includes a preamble 44, which is used to synchronize pseudo-random (PN) generators of the transmitter and the receiver. Link ID 46 is a field of fixed length (e.g., 16 bits long for one embodiment), and is unique to the link, thus identifying a particular subnet 10. Data from the server 12/client 16 is of variable length as indicated by a length field 48. Cyclic redundancy check (CRC) bits 50 may be used for error detection/correction in the conventional fashion.

For the illustrated embodiment then, each frame 52 is divided into a forward slot F, a backward slot B, a quiet slot Q and a number of radio turn around slots T. Slot F is meant for server 12-to-clients 16 communication. Slot B is time shared among a number of mini-slots $B_1$, $B_2$, etc., which are assigned by server 12 to the individual clients 16 for their respective transmissions to the server 12. Each mini-slot $B_1$, $B_2$, etc. includes a time for transmitting audio, video, voice, lossy data (i.e., data that may be encoded/decoded using lossy techniques or that can tolerate the loss of some packets during transmission/ reception), lossless data (i.e., data that is encoded/decoded using lossless techniques or that cannot tolerate the loss of any packets during transmission/ reception), low bandwidth data and/or command (Cmd.) packets. Slot Q is left quiet so that a new client may insert a request packet when the new client seeks to log-in to the subnet 10. Slots T appear between any change from transmit to receive and vice-versa, and are meant to accommodate individual radios' turn around time (i.e., the time when a half-duplex radio 14 switches from transmit to receive operation or vice-versa). The time duration of each of these slots and mini-slots may be dynamically altered through renegotiations between the server 12 and the clients 16 so as to achieve the best possible bandwidth utilization for the channel. Note that where full duplex radios are employed, each directional slot (i.e., F and B) may be full-time in one direction, with no radio turn around slots required.

Forward and backward bandwidth allocation depends on the data handled by the clients 16. If a client 16 is a video consumer, for example a television, then a large forward bandwidth is allocated for that client. Similarly if a client 16 is a video generator, for example a video camcorder, then a large reverse bandwidth is allocated to that particular client. The server 12 maintains a dynamic table (e.g., in memory at server 12 or host 13), which includes forward and backward bandwidth requirements of all on-line clients 16. This information may be used when determining whether a new connection may be granted to a new client. For example, if a new client 16 requires more than the available bandwidth in either direction, server 12 may reject the connection request. The bandwidth requirement (or allocation) information may also be used in deciding how many radio packets a particular client 16 needs to wait before starting to transmit its packets to the server 12. Additionally, whenever the channel conditions change, it is possible to increase/ reduce the number of ECC bits to cope with the new channel conditions. Hence, depending on whether the information rate at the source is altered, it may require a dynamic change to the forward and backward bandwidth allocation.

Architectures such as that described above, and in general all direct sequence spread spectrum communication protocols, that are based on a limited number of available channels, suffer from the drawback of interference or non-operation when there are overlapping subnets operating in the same channel. Accordingly, it would be desirable to have a scheme that permits co-location of multiple operating subnets.

SUMMARY OF THE INVENTION

In one embodiment, the present scheme allows for allocating bandwidth within a common wireless communication channel used by a number of independent computer networks by assigning a portion of the total bandwidth of the common wireless communication channel to intra-network communications in each of the independent computer networks. This bandwidth allocation scheme may, from time to time, involve revising existing bandwidth allocations for one or more of the independent computer networks, for example when new networks, or new clients in existing networks, request bandwidth within the channel.

In a further embodiment, bandwidth allocation within a wireless communication channel shared by independent computer networks is negotiated by requesting the bandwidth allocation from a master network coordinator and configuring an intra-network communication protocol in accordance with a response therefrom. The intra-network communication protocol may be fashioned as a slotted link structure that includes transmission times for master and client devices of a computer network. These transmission times are preferably arranged within a hierarchy that includes transmission times for master and client devices of other networks that share the wireless communication channel.

In still another embodiment, bandwidth allocation is provided for a system that includes a number of independent computer networks, each sharing one or more common communication channels. At least one of the computer networks includes a master coordinator unit configured to allocate bandwidth utilization for at least one of the common communication channels among two or more of the independent computer networks. In some cases, the common communication channels are wireless communication channels. Sometimes, the master coordinator unit allocates an equal share of the total available bandwidth in the at least one common communication channel to all of the independent computer networks sharing that communication channel.

The common communication channel may support a slotted link communication protocol and the master coordinator unit may thus allocate bandwidth utilization by assigning transmission times within the slotted link communication protocol to those individual computer networks that share it. Each transmission time within the slotted link communication protocol may then include a transmission slot for a master device of a computer network associated with that transmission time and one or more transmission slots for client devices of the computer network associated with that transmission time.

In some cases, one or more of the independent computer networks may communicate with the master coordinator unit through a proxy-coordinator unit located in one of the independent computer networks. The proxy-coordinator unit may be located in a separate one of the independent computer networks from that of the master coordinator unit, in the same computer network as the master coordinator unit or in the same computer network as is utilizing its services.

Generally, for new computer networks, the master coordinator unit allocates bandwidth utilization within the common communication channel by first renegotiating existing bandwidth allocation among those ones of the independent computer networks currently operating in that channel. Then, bandwidth within that channel may be assigned to the new network. Before requesting such allocation, however, a master device within the new computer network should be configured to check for a free communication channel. That same master device may also be configured to request bandwidth allocation within the at least one common communication channel only if that channel is the least utilized of all the common communication channels utilized by the independent computer networks. To accommodate such requests, the master coordinator unit is configured to store the current bandwidth allocation of the at least one common communication channel in a table indexed by unique identifiers for those ones of the independent computer networks utilizing that channel.

These and other features and advantages of the present invention will be apparent from a review of the detailed description and its accompanying drawings that follow.

BRIEF DESCRIPTION OF THE DRAWINGS

The present invention is illustrated by way of example, and not limitation, in the figures of the accompanying drawings in which.

DETAILED DESCRIPTION

Described herein is a scheme for allowing co-location of multiple computer networks that use common communication channels. The present scheme provides for the operation of overlapping subnets in the same channel by employing a "Share and Survive" policy that achieves sharing of the total available bandwidth by the overlapping subnets through appropriate inter-subnet negotiations. These negotiations allow for transmission slot synchronization among the transmissions of the various network master devices of all the overlapping subnets. It should be remembered, however, that although the present scheme is discussed with reference to certain embodiments illustrated in the above-mentioned drawings, these methods and apparatus are merely examples of the broader concepts involved with the present invention.

Figure 3:
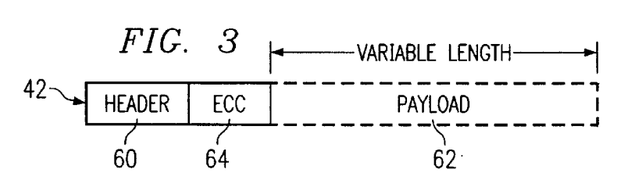
FIG. 3 illustrates a radio data frame for use in the communication protocol shown in FIG. 2.

As indicated above and shown more clearly in FIG. 3, server/client data packets 42 have three main parts: a header 60, a payload 62 and an error correction coding (ECC) block 64. In one embodiment, the header 60 is doubleword (DWORD) aligned so that data writes and reads to/from the packet 42 are simplified for hardware implementations. As shown further in FIG. 4, the header 60 may be a specified length and may include a number of fields $66a$–$66m$ (e.g., a number of valid fields and a number of reserved fields for future expansion).

Figure 4:
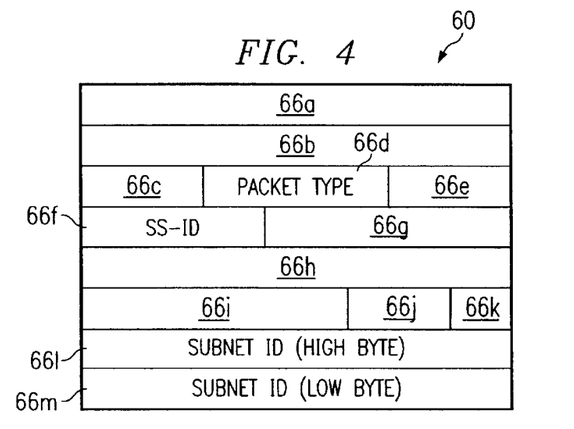
FIG. 4 illustrates an example of a data packet header for payloads of the radio data frame shown in FIG. 3.

Among these packet header fields is a packet type field $66d$. The packet type may be represented using a number of bits, for example 4 bits, which allows up to 16 different packet types to be differentiated. Such type identification is useful because of the varying types of information transported within subnet 10. For example, among the supported packet types may be: Audio, Video, Voice, Generic Real Time Data (from input/output devices), Commands to/from clients 16, Commands to/from the host 13, Generic Lossless Non-Real-Time Data, and Network Feature Update packets. The use of packet type field $66d$ allows the communication protocol to cater to video, audio, command and some low bandwidth data from subclients. Examples of such low bandwidth data include keyboard input, mouse input, joystick input, etc.

Unique to header 60 are the subnet session ID (SS-ID) field $66f$ and the subnet ID fields $66l$ and $66m$. Note, in this example the subnet ID has been split into a most significant (or high) byte, for inclusion in field $66l$, and a least significant (or low) byte, for inclusion in field $66m$. In other embodiments, more or fewer fields may be used, as appropriate. As will become apparent, the SS-ID allows for identification of a particular subnet during a session when multiple subnets are using a common channel. The subnet ID is a unique identifier that may be established at the time a subnet is installed. During network operations, client devices examine the subnet ID and reject any data packets that do not contain the subnet ID that has been established for their particular subnet. This operation is modified when a client device serves as a proxy-master, as explained further below.

Figure 5:
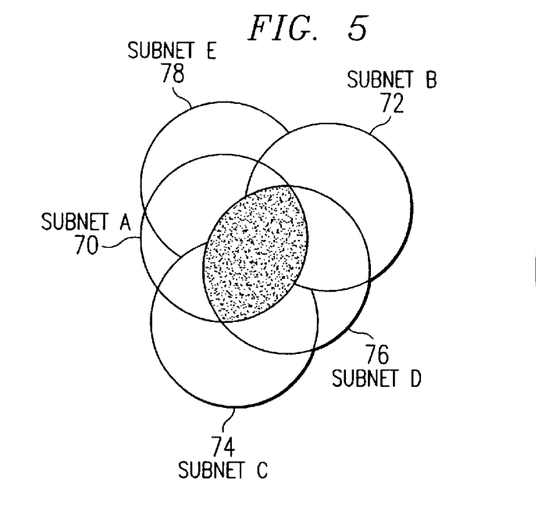
FIG. 5 illustrates an example of overlapping computer networks sharing common communication channels.

To understand the need for the present co-location services, consider the situation depicted in FIG. 5. Here multiple subnets 70, 72, 74, 76 and 78 are operating in a common area on one or more common channels. Such a situation may exist, for example, within an apartment complex, where several apartment residents each deploy subnets within their respective apartments. Because the radio transmissions from the various client and master devices of each subnet do not terminate at the apartment walls, there will be some region 80 where transmissions form the network devices of each subnet overlap (there will also be such overlap areas between various subsets of the multiple subnets, however, such areas have not been highlighted in the figure so as not to unnecessarily obscure the drawing). Without a mechanism to manage transmissions within the various subnets 70–78, the overlapping transmissions would lead to confusion among the several network devices and may lead to inoperability for one or more of the subnets as each competes for bandwidth.

Figure 6:
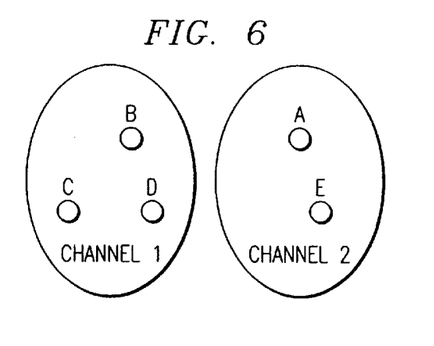
FIG. 6 illustrates an example of how bandwidth allocation achieved in accordance with the present scheme can provide non-overlapping computer networks that share common communication channels.

To avoid such a situation, the present scheme allows for sharing the total available bandwidth in one or more available communication channels, as shown in FIG. 6. Here, subnets A–E have been allocated bandwidth within the two available channels (determined by the operational constraints of the radios employed within the subnets) according to the mechanisms described below. Notice that by allocating the bandwith between the various subnets in this fashion, the subnets appear to be operating independently, without any overlapping transmission regions. Thus, the operation of the overlapping subnets has been made transparent to the users thereof. The mechanisms by which such operations may be achieved will now be discussed in detail.

First, consider the situation where the network master devices of any overlapping subnets can detect one another's transmissions. The case where this condition is not true will be discussed further below in connection with the proxy-coordinator concept. During network operations, the network master (e.g., such as server 12) of the first subnet to occupy a channel (as explained in the above-cited co-pending application) sets the SS-ID for the subnet to a default pattern (e.g., an all zero pattern). This indicates that this subnet is the first to occupy the channel. Thus, for the example shown in FIG. 5, if subnet B 72 is the first to commence operations, the network master for this subnet ($M_B$) will set the SS-ID of subnet B to all 0s and commence operations in a free channel (e.g., channel 1). The master device with the special (e.g., all 0) SS-ID (in this case, $M_B$) is also termed the Master Coordinator, as all the future bandwidth negotiations among subnets will coordinated by this device.

Now, assume that a client from another subnet, say subnet A 70, overlapping with the currently operating subnet seeks to commence operations and sends connection request to its associated master device $M_A$. As indicated above, this client $C_A$ will transmit such a request having a unique subnet ID. Accordingly, even if the transmission is detected within subnet B, only the master device of subnet A ($M_A$) will respond. The new client device $C_A$ and the associated master device $M_A$ communicate in the quiet slot of the subnet B communication scheme until the client is properly authenticated (the authentication process for a client is discussed in detail in the above-cited co-pending application). Upon successful authentication, the client $C_A$ is placed in a wait mode where the client continues to send only a command packet reporting its health in the quiet slot.

Figure 7:
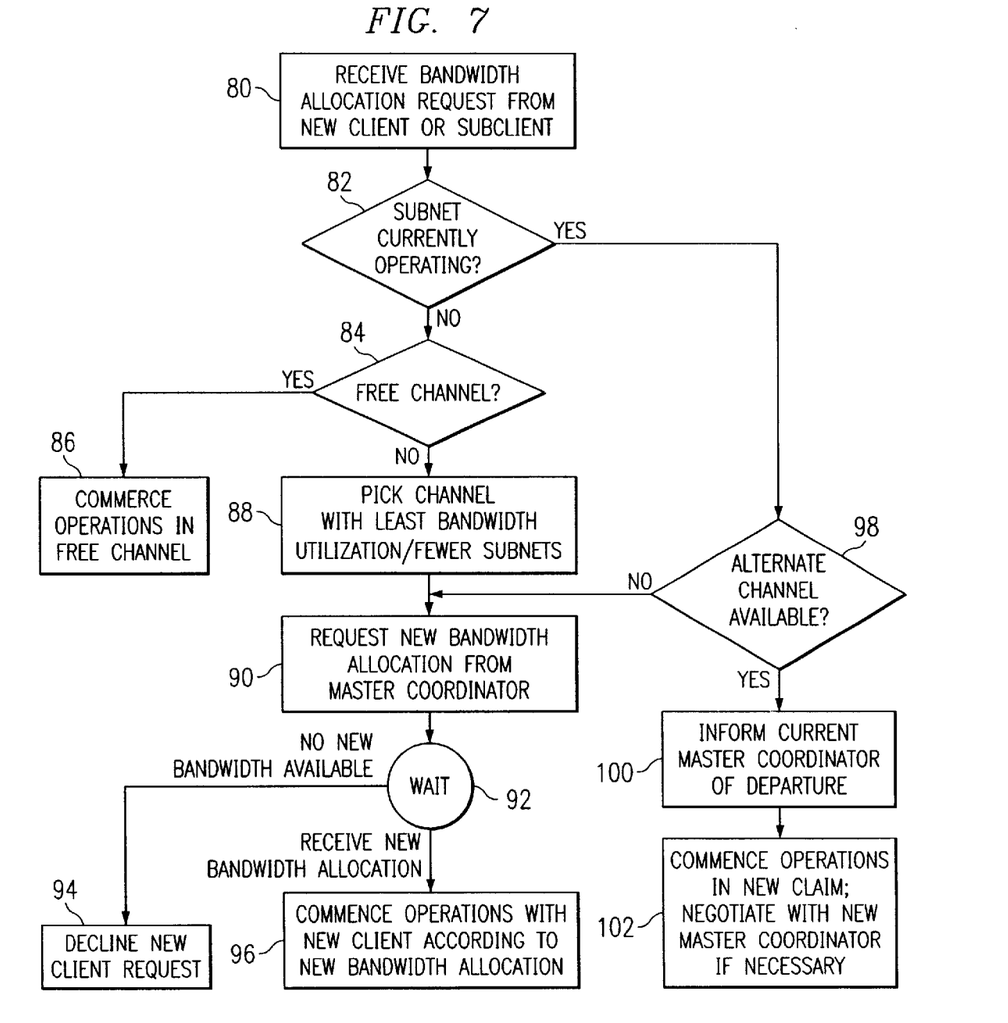
FIG. 7 illustrates one process by which a master device of a computer network can negotiate bandwidth allocation within a common communication channel in accordance with the present scheme.
Figure 8:
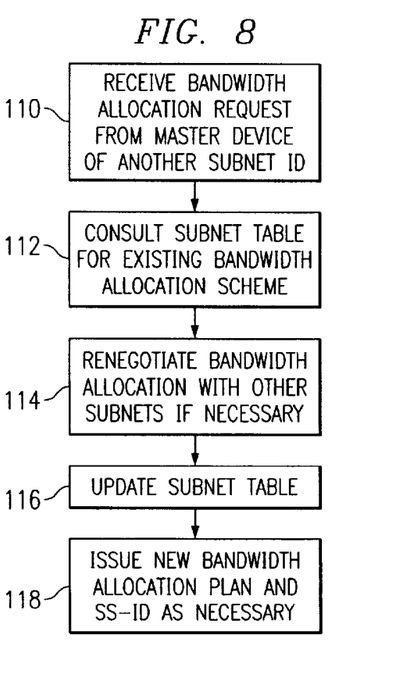
FIG. 8 illustrates the bandwidth allocation negotiation process as seen by a master coordinator in accordance with the present scheme.

Meanwhile the master $M_A$ from subnet A, begins channel/bandwidth negotiations with the master coordinator. FIG. 7 illustrates the negotiation process from the standpoint of $M_A$ while FIG. 8 illustrates the process from the standpoint of $M_B$ (the master coordinator). As these negotiations are at subnet level, all subnets are treated the same and, in one embodiment, will be entitled to an equal share of the total available channel bandwidth. Hence, as more and more subnets start operating, the bandwidth available to each subnet is limited to the total bandwidth in the channel equally divided among all the subnets. For example when three overlapping subnets operate in the same channel, they are guaranteed up to one third of the total bandwidth. When a subnet requests a lower bandwidth than its share, the remaining bandwidth may be shared among all the other operating subnets in the same channel. Of course, in other embodiments, some subnets may be granted a preference over others and so may be entitled to greater shares of the overall channel bandwidth.

As shown in FIG. 7, from the standpoint of MA, the negotiation process commences (step 80) when $M_A$ receives a bandwidth allocation request from a new client or subclient. In general, such a request may originate in a currently operating network or in a network that is not currently operating. Therefore, $M_A$ must decide (step 82) whether the subnet is operating or not. In the event the subnet is not currently operating (i.e., this is the first client in a new subnet to request a connection), $M_A$ checks for a free channel (step 84) as discussed in the above-cited co-pending application. Of course if such a free channel is available (as is the case in the present example), the new subnet commences operations in that channel (say channel 2) (step 86). By commencing operations in a free channel, $M_A$ becomes the master coordinator for that channel.

Now assume subnet D becomes operational. The master device associated with subnet D ($M_D$) will conduct the same process as was conducted by $M_A$. However, this time, $M_D$ will discover that both channels are occupied. In the absence of a free channel, $M_D$ searches (step 88) to find the channel with the least bandwidth utilization. In the event that all available channels have approximately the same bandwidth utilization, $M_D$ will choose to operate in the channel supporting the fewest number of subnets. The approximate bandwidth utilization of a channel can be estimated based on a measurement of the amount of idle time in the channel. As explained in the above-cited co-pending application, master devices (and, indeed client devices as well) are configured to detect idle time in the channel (e.g., times when no transmissions between servers and clients are occurring). By using a counter or other similar device, the master devices can estimate the idle time and thus arrive at an estimate of the channel's bandwidth utilization. The number of subnets operating in a channel can be determined by examining the different SS-IDs being broadcast within the channel. Recall that each subnet will be assigned a unique SS-ID (as explained below) and so the number of unique SS-ID values will indicate the number of operational subnets within a channel.

In the present case, assume $M_D$ determines that channel 1 has the lower bandwidth utilization. Having determined an appropriate channel, $M_D$ now begins communications with the master coordinator for that channel ($M_B$) (step 90). Essentially, $M_D$ will be requesting its equal share (or some portion thereof, say 30%) of the channel bandwidth and, because this is a subnet that was not previously operating, will also request that an SS-ID for the subnet be assigned by the master coordinator for the channel. Upon transmitting such a request, $M_D$ waits (state 92) for a reply from the master coordinator.

Referring now to FIG. 8, the negotiations can be viewed from the standpoint of the master coordinator (e.g., $M_B$). At the outset (step 10) the master coordinator will receive the bandwidth (and, if appropriate SS-ID) request from the another subnet master. As part of the request, the master coordinator will receive the subnet ID of the new subnet. Once a master coordinator starts the negotiation process with another master device, it is assumed that the new master device (e.g., $M_D$ in the above example) has already searched for other available channels and has decided that the current channel (i.e., that being used by the master coordinator) is utilizing the least bandwidth.

Figure 9:
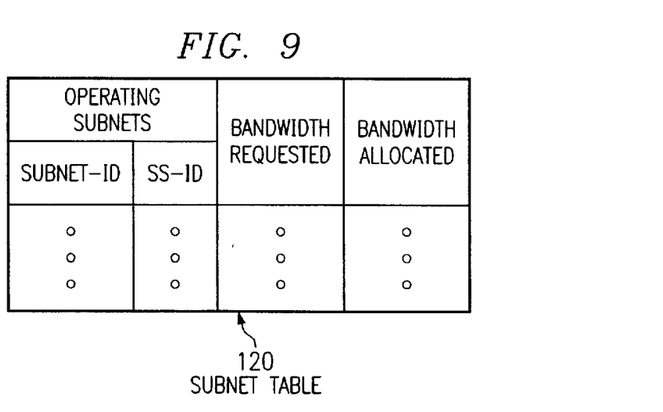
FIG. 9 illustrates an example of a subnet table maintained by a master coordinator.

The master coordinator is responsible for keeping track of all the bandwidth negotiations/allocations done so far and may periodically communicate such information to all other master devices sharing the channel. To maintain such information, the master coordinator constructs a subnet table as shown in FIG. 9. The subnet table 120, which may be stored in memory at a host device, includes all the currently operating subnets identified by their SS-ID and subnet ID. For each subnet, the bandwidth requested by that subnet and the bandwidth allocated by the master coordinator are indexed.

Upon receipt of the new bandwidth allocation request by the new master ($M_D$ in the present example) then, the master coordinator conducts consults the subnet table (step 112 in FIG. 8) to determine the existing bandwidth allocation. In some cases, accommodating the new request will require re-negotiation with all the operating subnets (step 114) so as to provide a fair share in the bandwidth to the new incoming subnet. Once these bandwidth allocations have been sorted out, the subnet table can be updated (step 116) and the master coordinator may issue the new bandwidth allocation to the new master (MD). In addition, the master coordinator will issues an SS-ID to the new incoming subnet (e.g., in sequential order) and add that subnet's bandwidth information to the subnet table (step 118).

Now returning to FIG. 7, the new master device ($M_D$ in this case) receives the response from the master coordinator and transitions out of wait state 92. In some cases, the master coordinator may have been unable to allocate sufficient bandwidth to meet the new master's request. For example, it may be the cases where the channel is not being fully utilized, but bandwidth may have been reserved for a known bandwidth consumer that will enter operation (e.g., a video consumer). Thus, in such cases the new master may have to decline the original client request (step 94). In most cases though, the master coordinator will assign the requested bandwidth (up to a subnet's equal share) and the new subnet can commence operations using the assigned SS-ID (step 96).

Thus, in the present example, subnet D may commence operations in channel 1 with subnet B. To do so, the slotted link commnication protocol used within the subnets must be altered from that shown in FIG. 2. To ensure that the overlapping subnets do not interfere with one another, the communication protocol is changed to resemble that shown in FIG. 10.

Figure 10:
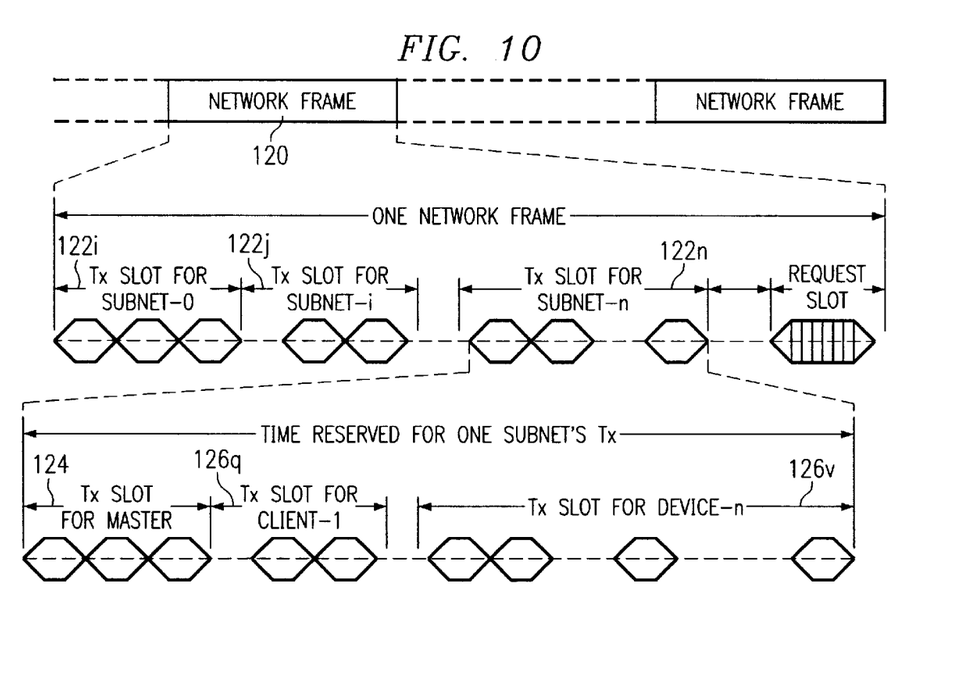
FIG. 10 illustrates a modified slotted link structure communication protocol configured to accommodate multiple computer networks in accordance with the present scheme.

As indicated, the overall slotted link structure of the wireless communication protocol is maintained. This time, however, each frame 120 is divided up into transmission slots 122 for each subnet operating in the channel. Each subnet's transmission slot is further divided into forward (for the subnet master device) and reverse (for the subnet client devices) transmission slots 124 and 126, respectively, of fixed (but negotiable) time duration. During forward time slots F, a subnet master may transmit video and/or audio data and/or commands to clients of that subnet, which are placed in a listening mode. During reverse time slots, the subnet master listens to transmissions from clients within its subnet. Such transmissions may include audio, video or other data and/or commands from a client or an associated subclient. As before, each transmission slot (forward or reverse) may be made up of one or more radio data frames of variable length, with each radio data frame being comprised of server/client data packets, which may also be of variable length.

Further, a request slot Q and a number of radio turn around slots (not shown in detail) may be included. Slot Q is left quiet so that a new client or subnet may insert a request packet when the new client/subnet seeks to log-in. Turn around slots may appear between any change from transmit to receive and vice-versa, and are meant to accommodate individual radios' turn around time (i.e., the time when a half-duplex radio switches from transmit to receive operation or vice-versa). The time duration of each of these slots may be dynamically altered through renegotiations between a subnet master and its clients so as to achieve the best possible bandwidth utilization for the channel.

The above scenario may be repeated in a substantially similar fashion as subnets C and E come on-line. In each case, the new subnet master checks to find the best available channel and negotiates for bandwidth allocation with that channel's master coordinator. Thus, the subnet C master may determine that channel 1 has the lowest bandwidth utilization (even though it has two operating subnets) and commence operations in that channel after suitable negotiations with $M_B$. The subnet E master may, however, find that both channels have approximately equal utilization (after the addition of subnet C to channel 1) and choose to operate in channel 2 (after negotiating with $M_A$, the channel's master coordinator) because it has fewer operating subnets. The end result is the subnet channel sharing scheme illustrated in FIG. 6.

The above scenarios dealt with the situation where a subnet is coming on-line for the first time in the presence of other subnets. However, it may be the case where a currently operating subnet has a new client device added, and so requires a new bandwidth allocation.

As shown in FIG. 7, this may be the situation when, at step 82, the subnet master recognizes that the new client request is being made in a currently operating subnet. In such cases, the subnet master checks (step 98) to determine whether an alternate channel that would provide better bandwidth allocation is available. The channel changing processes are discussed in detail in the above-cited co-pending application. For purposes of the present scheme, it is sufficient to recognize that upon determining that an alternate channel would provide better bandwidth allocation, the subnet master informs its current master coordinator that it is departing the channel (step 100—so that the master coordinator may update its subnet table and reallocate bandwidth accordingly) and commences operations with its subnet in the new channel (step 102). In some cases, these new channel operations may require the above type of bandwidth negotiations with a master coordinator for that channel. In other cases, the subnet master may become a new master coordinator in the new channel. Of course, if no new channel is available, the subnet master that received the new client request begins bandwidth allocations renegotiations with its master coordinator in the familiar fashion (step 90).

During network operations all subnet master devices (other than a master coordinator) periodically check the other available channels for low bandwidth utilization and low interference. This allows the subnet master to move their subnets to less crowded channels as they become available. During these periodic checks, the master coordinator for the subnet's current channel is advised accordingly, so that the originally negotiated bandwidth is retained while the subnet master device is checking other channels. Master coordinators are prevented from such operations because they cannot be temporarily absent from the current channel. Otherwise, the subnet synchronization maintained by the master may suffer.

The time duration between channel checks by a subnet master is made random to avoid multiple subnets changing channels at the same time. Whenever a master device sharing bandwidth in a channel finds another channel with better bandwidth, it informs the master coordinator before changing the channel so that the relieved bandwidth can be made available. Additionally and as discussed above, such channel checks are performed when a new client or subclient is coming online.

Whenever a master coordinator is shutting down its subnet (e.g., due to all of its clients are being off-line), it instructs the master device with the lowest SS-ID to take over the responsibilities of master coordinator. Along with such a request the entire subnet table 120 is passed to the new master coordinator. The new master coordinator alters its own subnet's SS-ID to the special (e.g., all 0) SS-ID and informs its clients to do the same. During this hand over, any requests from new subnets will be delayed. Once the hand over is complete, however, normal operations may resume with the new master coordinator taking over the responsibility of maintaining subnet synchronization.

The processes discussed above are used when the master devices of the overlapping subnets are able to communicate directly with one another. However, situations arise in which this condition is not true. For example, it may be that only one or a few clients in a subnet can detect the presence of two or more master devices, but the master devices cannot detect each other's transmissions. In such a case, an overlap still exists, but a different inter-master communication process must be employed. To accommodate such situations, the present scheme introduces the concept of a proxy-coordinator.

In cases where master devices of overlapping subnets can not receive each other's transmissions while at least one of the on-line clients of one of the subnets can, the device that can receive transmissions from both master devices assumes the responsibility of a proxy-coordinator. As such, this device coordinates the bandwidth allocation negotiations between the two master devices.

To avoid unnecessary complications, any device that can receive transmissions from two master devices (each using the special master coordinator SS-ID) can volunteer to serve as a proxy coordinator. Thus, if there exists more than one device that is in the overlap region, the master device can choose any of these devices to take on the proxy coordinator responsibility. Nevertheless, the master can also make use of certain properties of various client devices, such as mobility, to make a decision as to which client to choose as the proxy coordinator. Stationary devices are usually preferred over mobile devices for the reason that the mobile device may be transported outside of the overlap region.

Of course, a device operating with the assistance of a proxy coordinator should not itself be a proxy coordinator. This avoids a chain of proxy coordinators, which can lead to a disastrously long chain of subnets sharing bandwidth in the same channel. On a similar note, the number of subnets connected to group of subnets through proxy coordinators should be limited. The number of subnets so connected may depend on the number of overlapping subnets and the number of different channels available. For example, in a cubic problem of four overlapping subnets in a plane, up to 12 total overlapping subnets may exist. With at least two different channels being available, this leaves up to six overlapping subnets in each channel. That is four subnets in the same plane as the master coordinator and one subnet on each of the other two planes. Hence the number can be two, though four may be safer.

Figure 11:
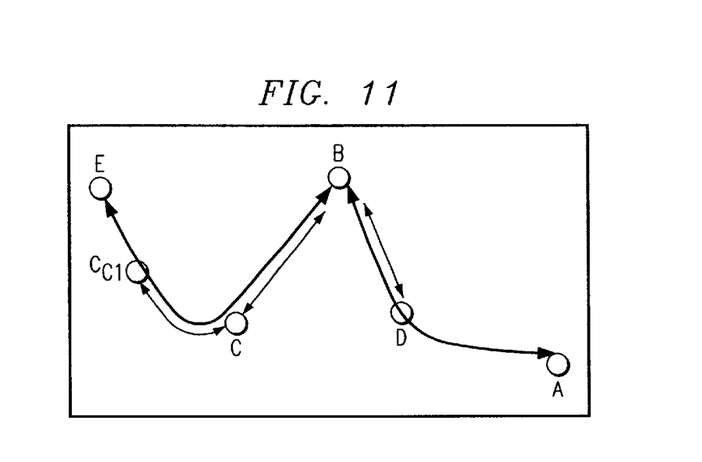
FIG. 11 illustrates two examples of the use of proxy-coordinators in providing co-location services in accordance with the present scheme.

A proxy coordinator essentially provides a tunnel for communication between a master coordinator and a master device that is not able to receive transmissions from the master coordinator. If a client device is assigned for this purpose, the tunnel includes the client device and the corresponding master device of that subnet as shown in FIG. 11. In this example, subnet B commenced operations first and so the master device associated with subnet B assumed master coordinator responsibilities. Next, subnet D came on-line and began to share bandwidth with subnet B. Similarly, subnet C began sharing bandwidth with subnets B and D when it came on-line.

Now, when subnet A comes on-line, assume that the master device of subnet B cannot detect transmissions from the master device of subnet A and/or vice versa. Thus, subnet A may commece operations in the channel being used by subnet B. This situation will be dected by devices in subnet D and the subnet D master will report the overlap to the master coordinator of subnet B.

Upon receiving the report of subnet A, the master coordinator assigns the master device in subnet D as a proxy coordinator. In other cases, this responsibility may be delegated to any device in subnet D that can detect the overlapping transmissions. The master coordinator will instruct its proxy coordinator in subnet D to begin proxy bandwidth allocation negotiations with the subnet master in subnet A. In other cases, these processes may be initiated by the subnet A master.

Thus, the proxy coordinator in subnet D acts as a tunnel between subnets B and A (i.e., between the master coordinators). The subnet master in subnet A may accept the invitation (as relayed through the proxy coordinator) to join the group already including subnets B, C and D and, if so, will be assigned an SS-ID in that group by the master coordinator in subnet B. All transmissions to/from subnet A will be tunneled through the proxy coordinator in subnet D.

Now assume subnet E comes on-line. In the event subnet E cannot use an alternate channel, it will recognize that client C1 is participating in operations with other network devices. Acordingly, the subnet master in subnet E will attempt to join the existing group of subnets by communicating a request for client C1 to act as a proxy coordinator. Client C1 can tunnel this request through its subnet master to the master coordinator in subnet B and, if acceptable, that master coordinator will designate client C1 as a proxy coordinator for use by subnet E. Thus, client C1 will serve as a tunnel between subnet E and the master coordinator. This will allow subnet E to be assigned an SS-ID as well as its protion of the total channel bandwidth.

In general, the subnet sharing bandwidth with the assistance of a proxy coordinator starts its transmissions only after that of the proxy-coordinator. Then the proxy coordinator sends an end of transmission message/packet to the master coordinator after the completion of the new subnet's transmissions. This results in marginally increased overhead on the channel bandwidth, but allows for a close time synchronization of transmissions among the bandwidth sharing subnets.

Whenever a proxy coordinator wants to leave its subnet (or the group of subnets), it does so only after informing both the master coordinator and the subnet it is currently servicing. This allows the master coordinator to attempt to shift the proxy coordinator responsibilities to another device that can receive transmissions from both sides of the group. If this is not possible, then the subnet that is getting disconnected can form its own group in the same channel, as there will be no interfering overlap.

As can be observed from the above example, there are two basic situations in which proxy coordinator service can be initiated. The first concerns a new subnet coming on-line. Where a new subnet master is coming online with its new subnet, and if it detects packets from another subnet or group of subnets, then that master will transmit channel bandwidth allocation requests meant for the master coordinator as discussed above. If the master coordinator does not respond (e.g., indicating that the master coordinator cannot detect the new master's transmissions), then the new master device broadcasts a request for proxy-master service.

The client devices that detect the proxy-master services request retransmit the same to their corresponding subnet masters. These master devices, in turn, send the request to their associated master coordinator. The mater coordinator assigns one of the subnet master devices that can directly detect the new master device as the proxy-coordinator for the new subnet. If there are no master devices, that can directly detect this new master device, then the master coordinator assigns one of the available client device for this purpose.

The second scenario concerns the situation where a new device detects two master coordinators. If there are two sets of subnets already operating in the same channel, and if a new client ($C_x$) coming on-line to one of the masters detects two master coordinator packets ($MC_x$ and $MC_y$) with different subnet IDs, then it reports this condition to its master device ($M_x$). The prefered solution to this scenario has the subnet corresponding to the new device choosing to operate in another channel, as otherwise it becomes a nasty bridge between two physically separated subnet groups. Hence, the master device $M_x$ tries to move its operation from the current group to another group in a different channel.

If this sort of channel chaning operation is not possible, then $M_x$ informs the associated master coordinator ($MC_x$) of the situation. The master coordinator broadcasts the existence of such a situation to all its associated subnets and requests the master device $M_x$ to permit the device $C_x$ to assume proxy-master responsibility. Once this permission is granted, the device $C_x$ acts as a tunnel between its master device ($M_x$) and the new master device, $MC_y$.

In this scenario, the negotiation between two master coordinators can result in merging two subnet groups into one and/or splitting one of the groups into two and merging a portion of the split subnet into the first group. If there is a portion of the group that can not be accommodated in the same group, those subnets will be requested to leave the group and join or form another group. Additionally, it is possible for an entire group to move over to another channel, if a free channel is available, or to join another group in a different channel. The criteria for determining whether a group should split and/or join another group may include the length of existence of a group, the number of currently operating subnets and the total bandwidth utilization in the group.

Thus, a co-location negotiation scheme for a computer network has been described. Although discussed with reference to certain illustrated embodiments, the present invention should not be limited thereby. Instead, the present invention should only be measured in terms of the claims that follow.

What is claimed is:

1. A method of allocating bandwidth within a common wireless communication channel between multiple independent computer networks operating in a common area, the method comprising:
   receiving requests to access the common wireless communication channel from multiple independent computer networks; and
   assigning responsibility for managing the common wireless communication channel to one of the independent computer networks, wherein the one of the independent computer networks assigned responsibility for managing the common wireless communication channel assigns a portion of the total bandwidth within the common wireless communication channel to intra-network communication in each of the independent computer networks.

2. The method of claim 1 wherein assigning a portion of the total bandwidth within the common wireless communication channel includes revising existing bandwidth assignments for one or more of the independent computer networks.

3. The method of claim 2 wherein the revising of the existing bandwidth allocations is performed upon the introduction of a new independent computer network.

4. The method of claim 2 wherein the revising of the existing bandwidth allocations is performed upon the introduction of a new device within one of the independent computer networks.

5. A method for negotiating a bandwidth allocation within a common wireless communication channel shared by multiple independent computer networks in a common area, the method comprising:
   requesting bandwidth allocation for the common wireless communication channel from a master coordinator responsible for managing the wireless communication channel's bandwidth; and
   configuring a slotted link communication protocol used within each of the independent computer networks in accordance with a response from the master network coordinator.

6. The method of claim 5 wherein the slotted link communication protocol comprises a slotted link structure.

7. The method of claim 6 wherein the slotted link structure includes transmission times for master and client devices of an independent computer network computer network.

8. The method of claim 7 wherein the transmission times for the master and client devices are arranged within a hierarchy that includes transmission times for master and client devices of other networks that share the common wireless communication channel.

9. The method of claim 5 wherein the bandwidth allocation within the wireless communication channel is maintained by the master coordinator according to unique identifiers associated with those computer networks sharing the wireless communication channel.

10. A system of negotiating and allocating bandwidth within a common wireless communication channel between multiple independent computer networks operating in a common area, comprising a number of independent computer networks each sharing one or more common wireless communication channels, at least one of the computer networks including a master coordinator unit configured to allocate bandwidth utilization for at least one of the common wireless communication channels among two or more of the independent computer networks, each independent computer network including a network master device to communicate and negotiate bandwidth allocation with the master coordinator.

11. The system of claim 10 wherein the master coordinator unit allocates an equal share of the total available bandwidth in the at least one common communication channel to all of the independent computer networks sharing that communication channel.

12. The system of claim 11 wherein the at least one common communication channel supports a slotted link communication protocol and the master coordinator unit allocates bandwidth utilization by assigning a transmission times within the slotted link communication protocol to those individual computer networks that share the at least one common communication channel.

13. The system of claim 12 wherein each transmission time within the slotted link communication protocol comprises a transmission slot for a master device of a computer network associated with that transmission time and one or more transmission slots for client devices of the computer network associated with that transmission time.

14. The system of claim 10 wherein at least one of the independent computer networks communicates with the master coordinator unit through a proxy-coordinator unit located in one of the independent computer networks.

15. The system of claim 14 wherein the proxy-coordinator unit is located in a separate one of the independent computer networks from that of the master coordinator unit.

16. The system of claim 10 wherein the master coordinator unit allocates bandwidth utilization within the at least one common communication channel to a new independent computer network by first renegotiating existing bandwidth allocation among those ones of the independent computer networks currently operating in the at least one common communication channel and then assigning a bandwidth allocation within the at least one common communication channel to the new independent network.

17. The system of claim 16 wherein a master device within the new independent computer network is configured to check for a free communication channel before requesting bandwidth allocation within the at least one common communication channel from the master coordinator unit.

18. The system of claim 17 wherein the master device within the new independent computer network is further configured to request bandwidth allocation within the at least one common communication channel only if that channel is the least utilized of all the common communication channels utilized by the independent computer networks.

19. The system of claim 18 wherein the master coordinator unit is configured to store the current bandwidth allocation of the at least one common communication channel in a table indexed by unique identifiers for those ones of the independent computer networks utilizing the at least one common communication channel.

20. The system of claim 10 wherein the master coordinator unit is configured to allocate bandwidth in the at least one common communication channel equally among those of the computer networks utilizing the at least one common communication channel.

21. The system of claim 10 wherein the master coordinator unit is configured to allocate bandwidth in the at least one common communication channel according to preferences among those of the computer networks utilizing the at least one common communication channel.

22. The system of claim 14 wherein the proxy-coordinator unit is selected by the master coordinator from among two or more devices within one or more of the computer networks that are capable of providing proxy coordinator services.

23. The system of claim 22 wherein the proxy coordinator provides tunneling between the master coordinator and a master device located in the at least one independent computer network.

24. The system of claim 23 wherein the proxy coordinator is configured to synchronize communications between the at least one computer network and the one of the computer networks within which the master coordinator is located.

25. The method of claim 1 wherein the assigning a portion of the total bandwidth within the common wireless communication channel to intra-network communications in each of the independent computer networks having access to the common wireless communication channel comprises the independent computer network which has been assigned responsibility for managing the common wireless communication channel performing the assignments.

26. The method of claim 1 wherein responsibility for managing the common wireless communication channel is assigned to the first of the independent computer networks to occupy the common wireless communication channel.

27. The method of claim 1 wherein managing the common wireless communication channel comprises negotiating the initial distribution of the total bandwidth of the common wireless communication channel between the independent computer networks.

28. The method of claim 2 wherein revising existing bandwidth allocations for one or more of the independent computer networks comprises the independent computer network assigned responsibility for managing the common wireless communication channel redistributing the bandwidth between the independent computer networks.

29. The method of claim 1 wherein responsibility for managing the common wireless communication channel will be handled by a network master device at the assigned independent computer network.

30. The method of claim 29 wherein the network master device is a master coordinator.

31. The method of claim 1 wherein each independent computer network includes a network master device for negotiating bandwidth allocation with the independent computer network responsible for managing the common wireless communication channel.

* * * * *

UNITED STATES PATENT AND TRADEMARK OFFICE
CERTIFICATE OF CORRECTION

PATENT NO. : 6,480,506 B1
DATED : November 12, 2002
INVENTOR(S) : Gubbi

It is certified that error appears in the above-identified patent and that said Letters Patent is hereby corrected as shown below:

<u>Title page,</u>
Please add -- [73] Assignee: Sharewave, Inc., El Dorado Hills, Calif. --

Signed and Sealed this

Eighth Day of April, 2003

JAMES E. ROGAN
*Director of the United States Patent and Trademark Office*